(12) United States Patent
Gadow et al.

(10) Patent No.: US 8,613,801 B2
(45) Date of Patent: Dec. 24, 2013

(54) SINTERABLE SEMI-COKE POWDER WITH HIGH BULK DENSITY

(75) Inventors: Rainer Gadow, Aschau am Inn (DE);
Frank Kern, Tiefenbronn (DE);
Winfried Boenigk, Lüdinghausen (DE);
Matthias Levering, Essen (DE);
Claudia Boltersdorf, Gevelsberg (DE)

(73) Assignee: Rheinkalk GmbH, Wulfrath (DE)

( * ) Notice: Subject to any disclaimer, the term of this patent is extended or adjusted under 35 U.S.C. 154(b) by 0 days.

(21) Appl. No.: 13/131,651

(22) PCT Filed: Nov. 20, 2009

(86) PCT No.: PCT/EP2009/065538
§ 371 (c)(1),
(2), (4) Date: Jul. 25, 2011

(87) PCT Pub. No.: WO2010/060865
PCT Pub. Date: Jun. 3, 2010

(65) Prior Publication Data
US 2011/0275505 A1 Nov. 10, 2011

(30) Foreign Application Priority Data
Nov. 28, 2008 (DE) .................. 10 2008 059 482

(51) Int. Cl.
*C09C 1/44* (2006.01)
(52) U.S. Cl.
USPC ................. 106/472; 428/402; 501/1; 524/542
(58) Field of Classification Search
None
See application file for complete search history.

(56) References Cited

U.S. PATENT DOCUMENTS

| | | | | | |
|---|---|---|---|---|---|
| 1,733,620 | A | * | 10/1929 | Morrell | 44/281 |
| 1,950,309 | A | * | 3/1934 | Jennings | 208/408 |
| 2,339,932 | A | * | 1/1944 | Kuhl | 208/127 |
| 3,567,808 | A | * | 3/1971 | Smith | 264/29.7 |
| 3,801,469 | A | * | 4/1974 | Essenhigh | 201/17 |
| 4,071,604 | A | | 1/1978 | Schwemer | |
| 4,450,106 | A | * | 5/1984 | Forss | 530/500 |

(Continued)

FOREIGN PATENT DOCUMENTS

| | | |
|---|---|---|
| EP | 0281636 A1 | 9/1988 |
| EP | 0308824 A1 | 3/1989 |

(Continued)

OTHER PUBLICATIONS international Search Report for PCT/EP2009/065538, dated Mar. 15, 2010.

*Primary Examiner* — Kaj K Olsen
*Assistant Examiner* — Ross J Christie
(74) *Attorney, Agent, or Firm* — Honigman Miller Schwartz and Cohn LLP; Thomas A. Wootton; Jonathan P. O'Brien

(57) ABSTRACT

In a continuous method for production of a semicoke powder with high bulk density and flowability, a sinterable carbon powder (semicoke) is dispersed in water with addition of at least one binder and at least one liquefier, wherein the proportion of carbon in the dispersion is adjusted to at least 50 wt. %, relative to the mass of the dispersion, and the zeta potential of the dispersion is adjusted to less than −50 mV, the dispersion is submitted to homogenization and stabilization by continuous wet grinding with a residence time in the mill of less than 3 minutes and the homogeneous dispersion is spray-dried.

4 Claims, 9 Drawing Sheets

(56) References Cited

U.S. PATENT DOCUMENTS

| | | | |
|---|---|---|---|
| 4,749,664 A | * | 6/1988 | Ross et al. .................. 501/1 |
| 4,849,021 A | * | 7/1989 | Nakai et al. ................ 106/472 |
| 4,985,184 A | | 1/1991 | Takahashi et al. |
| 5,654,352 A | * | 8/1997 | MacDonald .................. 524/18 |
| 7,052,532 B1 | * | 5/2006 | Liu et al. .................... 96/154 |
| 2005/0227891 A1 | * | 10/2005 | Dreyer et al. ................ 510/301 |

FOREIGN PATENT DOCUMENTS

| | | |
|---|---|---|
| EP | 0552422 A1 | 6/1994 |
| JP | 01075566 A | 3/1989 |
| JP | 01103910 A | 4/1989 |

* cited by examiner

Zeta potential of CARBOSINT®, liquefied with 1% [w/w] lignin sulphonate

Bulk/tamped density as a function of the solids content

Bulk/tamped density as a function of the feed rate through the spray tower at a solids content of the slip of 55.8% w/w Density, compacted, as a function of the solids content Density, fired as a function of the solids content Density, compacted, as a function of the feed rate Density, fired at up to 1100°C as a function of the feed rate through the spray tower

SINTERABLE SEMI-COKE POWDER WITH HIGH BULK DENSITY

This application is the U.S. National phase of PCT Application No. PCT/EP2009/065538, filed Nov. 20, 2009, which claims the priority of German Patent Application No. 102008059482.2, filed Nov. 28, 2008, both of which documents are incorporated herein by reference in their entirety.

TECHNICAL FIELD TO WHICH THE INVENTION RELATES

The invention relates to a sinterable semicoke powder with high bulk density, a rapid continuous method for production thereof, use thereof for the production of carbon and graphite ceramics and a slip, which is an intermediate product in the claimed method.

BACKGROUND OF THE INVENTION

Carbon and graphite ceramics with grain sizes smaller than 20 μm are as a rule produced from two-component systems with a solid (coke) and a binder. To improve the property profile, additives are usually employed, which increase the coking residue of the binder. Two-component materials have the main drawback that after forming during carbonisation, the coke used expands, whereas the reinforcing binder framework shrinks. Shrinkage of both constituents does not occur until the pre-treatment temperature of the coke is exceeded. This fundamental problem explains the formation of microcracks in the structure and the limitation of the strengths attainable in the finished ceramic using this technology.

A new route employed sinterable semicokes such as CARBOSINT®, production of which is described in EP 0 552 422 B1. Semicoke is a carbon material, which is intermediate between a fusible pitch and an unfusible green coke. It can be obtained by incomplete carbonisation at a temperature between the initial melting of the pitch and 500° C. optionally in combination with oxidation at below 250° C. Optimally matched semicokes serve simultaneously as filling coke and binder in ceramics manufacture. Owing to the sticky surface, semicoke powder of this kind can be processed without further additives by die pressing or isostatic pressing. Although sinterable semicokes have long been available, and despite their advantageous property profiles, these single-component materials have so far not been widely adopted commercially, for the reasons explained below.

The advantage of the stickiness of the coke for its compaction means at the same time that such a material cannot be handled easily, because it tends to form lumps and to adhere in the feeding systems to automatic presses or during die filling. Therefore homogeneous die filling is far more difficult and involves considerable expense.

Another disadvantage of this coke is the low bulk density of about 0.4 g/cm$^3$. A component based on fine-grained carbon as a rule has a geometric density of 1.2 to 1.3 g/cm$^3$ after forming, which means that in die pressing it must be compacted by a factor of at least 3. A doubling of density can be controlled by the equipment. Higher compaction factors limit—even in the case of multilevel axial presses—the complexity and design freedom of the components that can be produced.

In the manufacture of components by isostatic pressing, the great stickiness of the coke makes homogeneous filling of the flexible die more difficult. Density gradients in the component resulting from inhomogeneities during filling cannot, however, be corrected in subsequent processing.

These disadvantages still hamper many possible applications, which require forming that is close to the final shape. Mechanical post-processing is generally too expensive. This impedes full utilisation of the potential of sinterable semicoke with respect to the product properties of technical carbon products.

To overcome these disadvantages and thus produce sinterable semicoke powder for the production of carbon and graphite ceramics close to the final shape, U.S. Pat. No. 4,985,184 proposes suspending the carbon powder with binder in a proportion from 0.01 to 5 wt. % and a non-ionic wetting agent in an amount from 0.01 to 3 wt. %, in each case relative to the mass of the solid matter, and then granulating by spray-drying. Methylcellulose or hydroxycellulose is proposed as binder, and alkylphenol ethylene oxides as wetting agents. A disadvantage of this method is the low solids content of the suspension of only 33%, necessitating high water evaporation rates during spray granulation, which is therefore associated with high process costs. Another disturbing factor in further processing is the large amount of additives of up to 8 wt. %.

SUMMARY OF THE INVENTION

The invention is therefore based on the object of providing a sinterable semicoke powder with a markedly increased bulk density and a flowability that permits problem-free processing of the coke by pressing methods, so that the usual metering techniques can be used in the production of ceramic formed bodies.

This object is achieved by a method that can be operated continuously, in which a sinterable carbon powder (semicoke) is dispersed in water with addition of at least one binder and at least one liquefier, wherein the proportion of carbon in the dispersion is adjusted to at least 50 wt. %, relative to the mass of the dispersion, and the zeta potential of the dispersion is adjusted to less than −50 mV, the dispersion is submitted to homogenisation by continuous wet grinding with a residence time in the mill of less than 3 minutes, preferably less than 2 minutes, and the homogeneous suspension is spray-dried.

The invention further relates to the dispersion (slip), which is obtainable by dispersing a sinterable carbon powder in water with addition of at least one binder and at least one liquefier, wherein the proportion of carbon in the dispersion is adjusted to at least 50 wt. %, relative to the mass of the dispersion, and the zeta potential of the dispersion is adjusted to at least −50 mV and submitting the dispersion to homogenisation by continuous wet grinding with a residence time in the mill of less than 3 minutes, preferably less than 2 minutes.

The invention further relates to the solid material in the form of granules, obtained by spray-drying.

In spray-drying, as a result of rapid drying of the sprayed droplets of the dispersion, there is agglomeration of the primary particles to far larger free-flowing secondary particles. The solid particles obtained after spray-drying have an angle of repose of 18° to 23°, preferably 18.5° to 22.5°, measured on the basis of DIN 53468. The ungranulated material has angles of repose of 41°. The $d_{50}$ value of the grain size distribution of the spray-granulated product was determined with a laser diffraction spectrometer from the company Malvern (Mastersizer 2000) and is 60 to 100 μm. This means that, after spray-drying, 50 wt. % of the carbon particles have a diameter of 60 to 100 μm. This is the size of the secondary particles.

Finally, the invention relates to the use of the spray-dried carbon particles for the production of carbon and graphite ceramics.

The combined method of continuous wet dispersion with short residence times in the mill and spray granulation improves the handling properties of a sinterable semicoke powder, for example CARBOSINT® powder according to EP 0 552 422 B1. Almost perfectly round, defect-free granules are obtained (FIG. 2). If spray granulation is carried out without prior wet dispersion, there is considerable sedimentation of the solid material in the storage vessel for spray-drying despite the use of additives and clogging of the spraying nozzle. The bending strengths of test specimens obtained according to the invention are also far higher than those of U.S. Pat. No. 4,985,184 at 65 MPa.

DESCRIPTION OF PREFERRED EMBODIMENTS OF THE INVENTION

Figure 1:
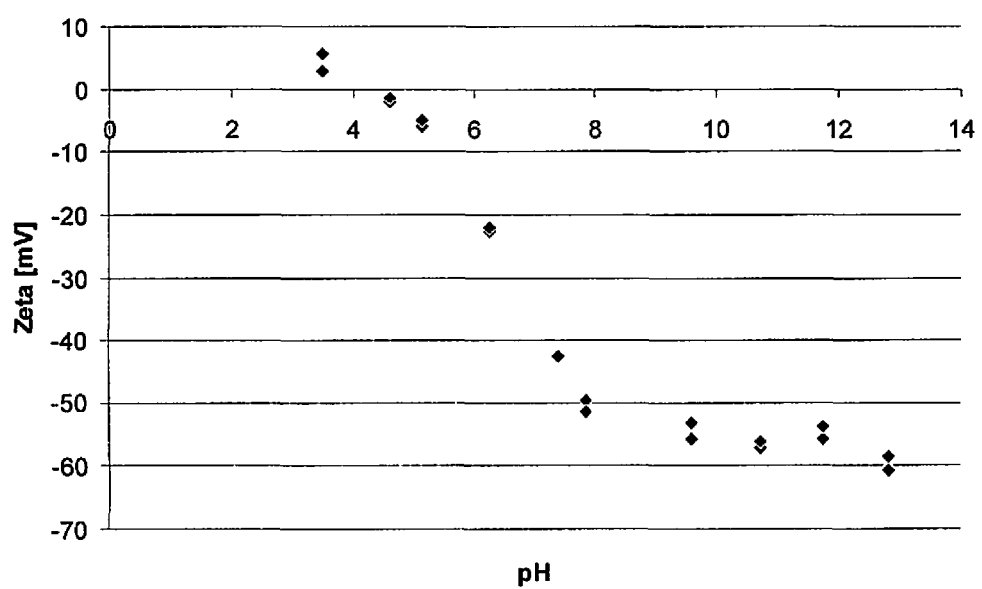
FIG. 1 shows the dependence of the zeta potential of the semicoke particles on the pH of the suspension.
Figure 2:
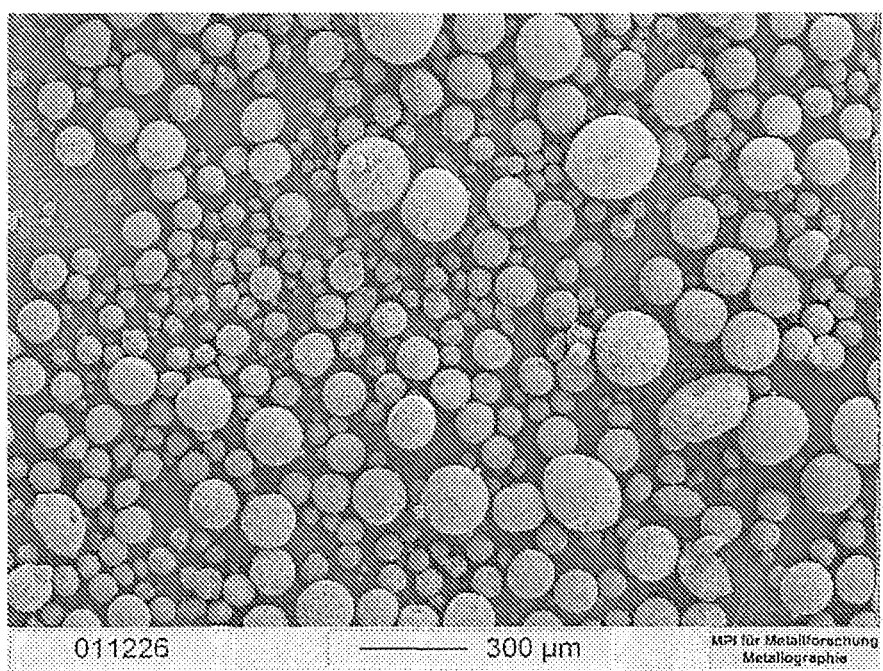
FIG. 2 shows a scanning electron micrograph of a semicoke treated according to the invention.
Figure 3:
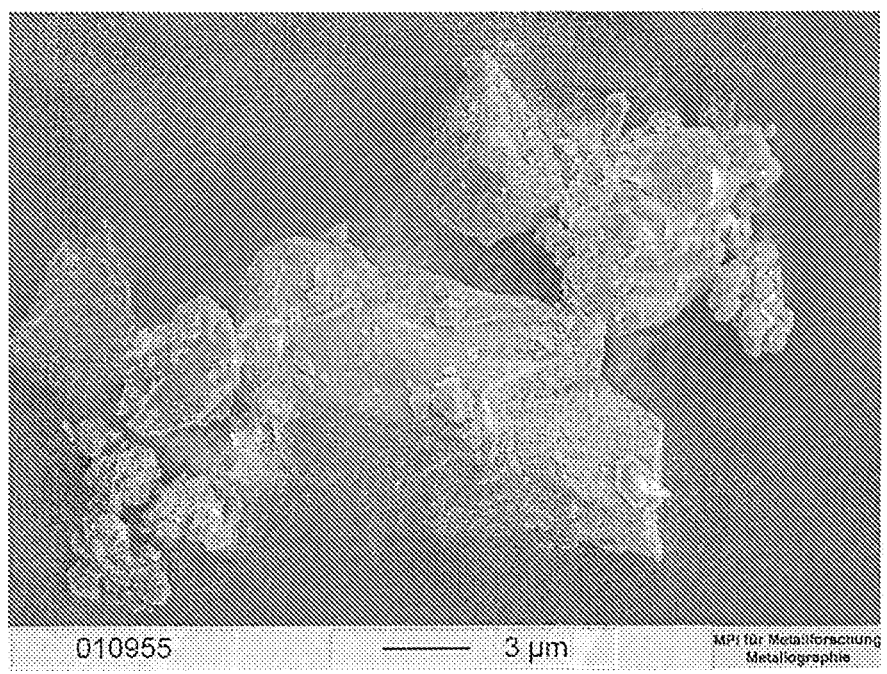
FIG. 3 shows a scanning electron micrograph of CARBOSINT®.

Sinterable carbon powders (semicokes) comprise the starting material for the method according to the invention. The production of said semicoke powder is described in EP 0 552 422 B1, whose disclosure is referred to for the purposes of the present invention. Carbon powder of this kind is produced by distillation of a bituminous material, such as tars or pitches derived from coal tar or aromatic mineral oil, at a pressure of up to 5 mbar and a final temperature of at least 400° C., dry grinding of the distillation residue to the desired particle size and oxidation of the ground distillation residue at temperatures below the temperature of the start of powder caking, until even the core of the individual particles no longer melts.

The sinterable semicoke powder is dispersed in water (slip). The proportion of semicoke powder in the dispersion is preferably adjusted to 55 to 59 wt. %, relative to the mass of the dispersion. The level of the proportion of solids in the dispersion will depend on the further processability by spray-drying. If the concentration of solid matter is too high, stable spray-drying is not possible. Generally, however, the proportion is set at a level such that the dispersion obtained can be processed further by spray-drying.

Liquefiers and binders can be used as dispersion additives. The liquefiers used are preferably alkali-free and alkaline-earth-free surface-active substances such as the commercially available substances Dolapix® CA, Dolapix® ET 85, Trusan® 450, 470, 480 and 490 and lignin sulphonate and a polymer of naphthalene sulphonic acid (NSF) produced with formaldehyde. Owing to its reproducible molecular weight distribution, synthetically produced NSF is particularly preferred over natural products with variable compositions. The proportion of the liquefier, relative to the mass of the solid matter, can be 0.5 to 5 wt. %.

Suitable binders comprise polyethylene glycols with molecular weights from 500 to 20 000 g/mol, preferably 2000 to 6000 g/mol, and polyvinyl alcohols. A suitable polyvinyl alcohol is for example PVA 4-88. The proportion of binder can be 0.5 to 2.5%, preferably 1 to 2 wt. %, relative to the mass of the solid matter.

To maintain the desired stability of the slip, the zeta potential is adjusted to less than −45 mV, preferably about −50 mV. The pH of the slip is adjusted to at least 7, preferably 8 to 12.

In order to ensure the desired stability of the slip, in a subsequent step the slip dispersion can be wet-ground in a ball mill operated continuously in through-flow. This results in deagglomeration of the particles with simultaneous wetting of the individual particles with the aqueous phase.

Deagglomeration can also be supported by treatment of the dispersion with ultrasound. Surprisingly, the residence time in the ball mill can be kept very short. This prevents any substantial change in the grain size distribution. The mill operates primarily as a disperser with high energy input.

The spray-drying that follows the dispersion/grinding operation is a continuous method for drying of solutions, suspensions, and pastes. By means of a nozzle (operated by fluid pressure or compressed air or inert gas) or rotating spray disks (4000-50 000 rev/min) the material to be dried is sprayed into droplets in a hot air stream (temperatures depending on the apparatus up to 300° C.), and as it falls through the spray tower it dries to form fine granules of spherical shape. Depending on the design or intended application, the hot air can flow in parallel or in countercurrent to the sprayed jet. The resultant dry product is generally separated from the air stream by a cyclone separator, from which it can be discharged. The particles obtained by spray-drying/granulation are free-flowing and have a size distribution d50 from 60 to 100 μm.

The bulk density of the sprayed granules according to the invention is 0.5 to 0.6 g/cm$^3$; the tamped density is about 0.6 g/cm$^3$.

The following examples offer further explanation of the invention.

EXAMPLES

Example 1

Production of the Sinterable Semicoke Powder

A coal-tar pitch with a softening point (Mettler) of 50° C., a content of quinoline-insoluble (QI) according to DIN 51921 of 13.2 wt. % and a content of toluene-insoluble (TI) according to DIN 51906 of 32.7 wt. % is distilled in a stirred evaporator at a pressure of 1 mbar up to 460° C. The distillation residue has a flow point (Tottoli) of 350° C. and contains 57.4 wt. % QI, 91.9 wt. % TI and 10.9 wt. % volatile constituents. It is dry-ground in a vibratory mill to an average grain size of 30 μm. The powder begins to cake at about 280° C. An oxidation temperature of only 180° C. is selected, to be certain of excluding caking of the powder even in the exothermic reaction that is to be expected.

A proportion of the ground residue is oxidised in the presence of air at 180° C., taking a sample in each case with an interval of one hour. The samples are pressed at 30 MPa to form test specimens, which are heated under inert gas in a chamber kiln with a temperature gradient of 1 K/min to 1000° C.

After an oxidation time of 10 hours, there is no longer any swelling of the specimen. The required oxidation time is therefore 10 hours, to make the powder unfusible into the core of the individual particles. The rest of the ground residue is therefore oxidised in air at 180° C. for 10 hours. The oxidised powder has an initial softening point of 250° C., an oxygen content of 2.9 wt. % and an optical anisotropy of 15 vol. %.

It contains 70.9 wt. % QI, 94.5 wt. % TI and 0.1 wt. % volatile constituents.

Example 2

Production of the Carbon Dispersion (Slip)

The composition of 18 test samples is shown in Table 4.

For production of the slip, 3000 g CARBOSINT®, 2.375 g deionised water, 60 g NSF as liquefier and 60 g binder (PEG 4000) are put in the stirred reactor. The solid material with a particle size distribution $d_{50}$ of 8 to 9 μm is slowly added, to achieve maximum uniformity of mixing. After a dispersion time of 1 h, the pH is adjusted with 25% ammonia solution to pH 10 and homogenised for a further 24 h. This is followed by fine dispersion (homogenisation) in a bead mill of the Dyno_Mill® KDL Pilot type from Willy A. Bachofen (WAB) AG. The grinding beads consist of cerium-stabilised zirconium oxide and have a diameter from 1.2 to 1.7 mm. The mill is filled with grinding beads up to a degree of filling of 85%.

The peripheral speed of the stirring disks is 10 m/s. The volume flow to be pumped through the mill by means of a displacement pump is 700 mL/min. The residence time in the bead mill is 50 to 80 seconds. After passing through the bead mill, the suspension is pumped into the spray tower, heated to the drying temperature.

Example 3

Spray-Drying

The slip obtained in example 2 is spray-dried with a spray tower from the company Nubilosa of the LTC type, operated in parallel flow. This spray tower is a pilot-plant spray tower for a water evaporation rate of max. 7.5 kg/h at a maximum drying air temperature of 350° C. The electric air heater has a heating power of 12 kW. The cylindrical part of the tower is 4 m long and has a diameter of 800 mm. At the top of the spray tower, the aqueous dispersion that is to be dried is fed via an externally mixing two-substance nozzle with a diameter of 1.5 to 2 mm into the drying chamber. Spraying requires a compressed air consumption of about 3 nm³/h at a compressed air excess pressure of 3 bar. At the bottom of the drying tower there are a cyclone and a jet-filter for separating the fines from the drying air stream. The product is trapped at the lowest point of the apparatus. Suspension throughputs of 2 to 8 L/h were operated at drying gas temperatures from 180 to 275° C.

The conditions of spray granulation for 18 test runs are shown in Table 5.

Example 4

Investigation of Bulk and Tamped Density

Bulk density was determined according to DIN 51705 and tamped density according to DIN 51916. The attainable bulk and tamped densities increase with increasing solids content (FIG. 4) and pass through a maximum with increasing feed rate (FIG. 5) through the spray tower. The bulk densities determined are 0.5 to 0.6 g/cm³. For the tamped density according to DIN 51916, maximum values of 0.61 g/cm³ are achieved.

Figure 4:
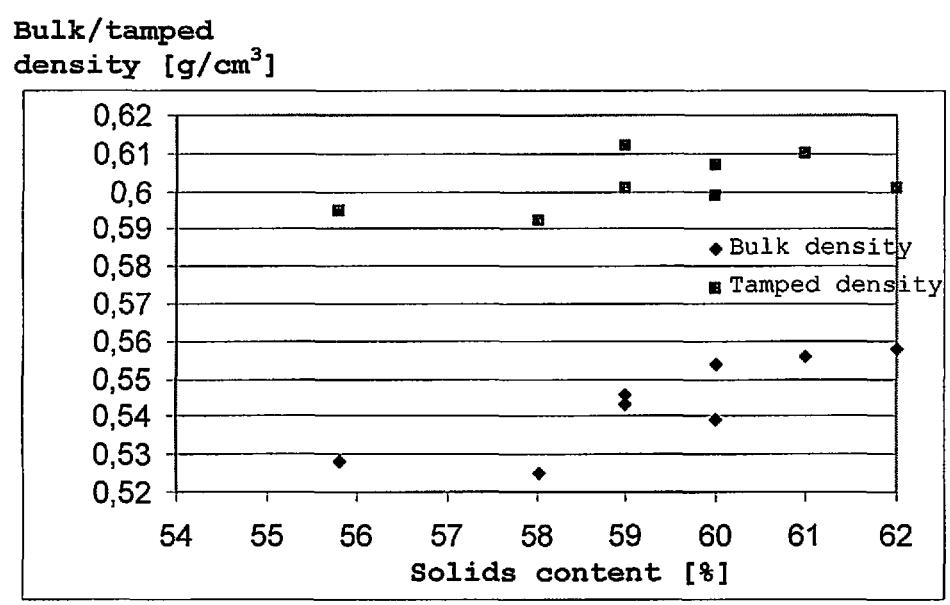
FIG. 4 shows the bulk/tamped density of the product according to the invention as a function of the solids content.
Figure 5:
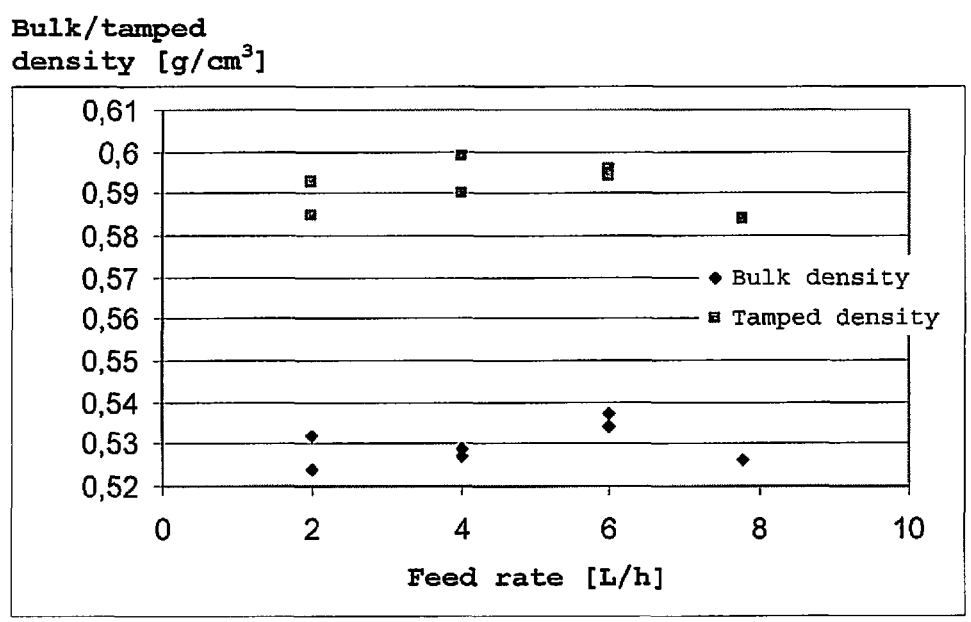
FIG. 5 shows bulk/tamped density as a function of the feed rate through the spray tower at a solids content of the slip of 55.8% w/w
Figure 6:
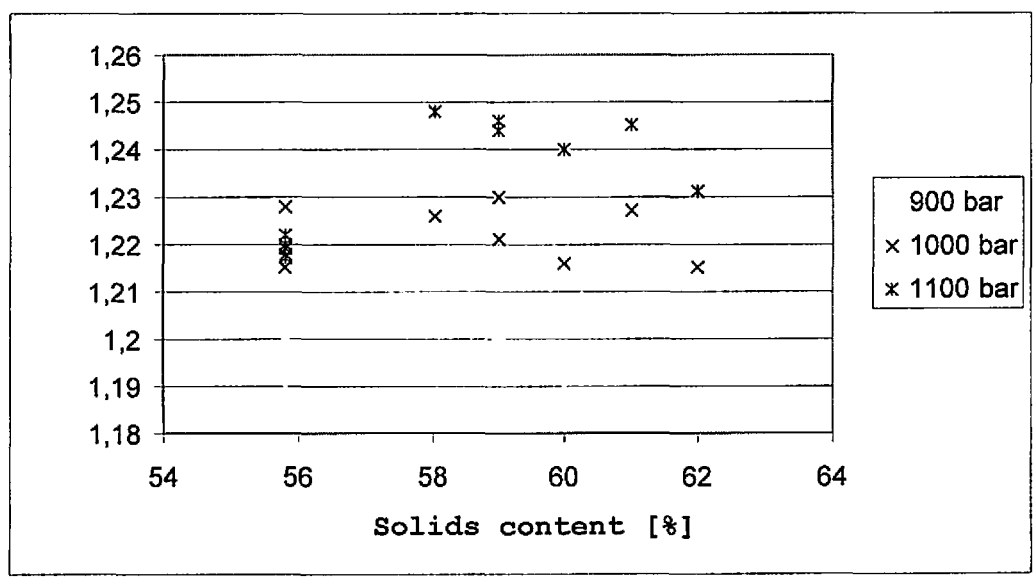
FIG. 6 shows the density of compacts as a function of the solids content of the slip.
Figure 7:
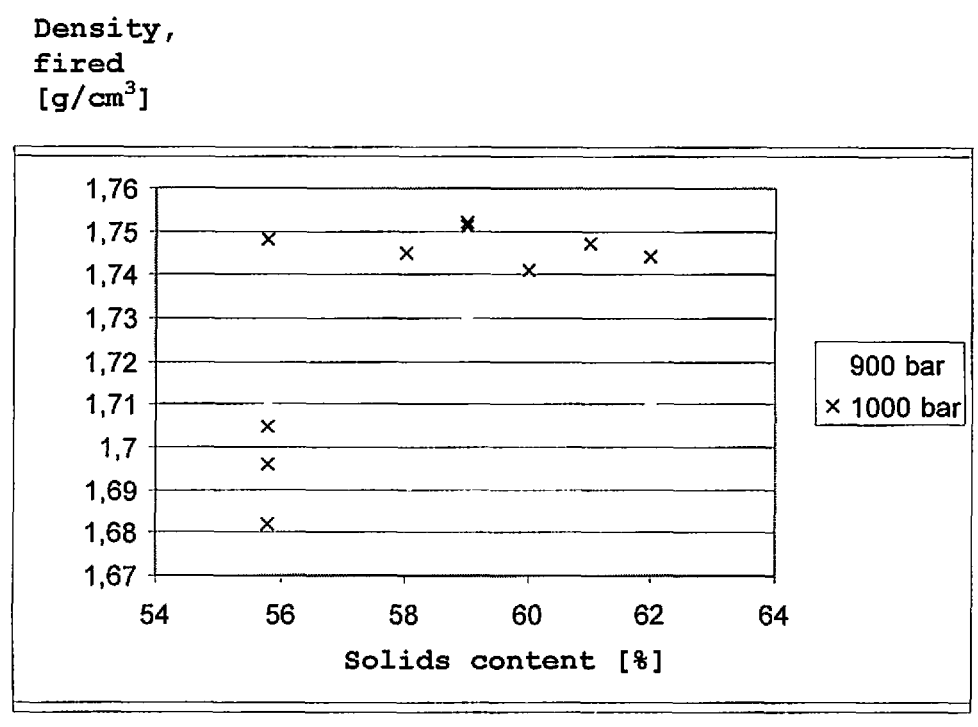
FIG. 7 shows the density of sintered compacts as a function of the solids content of the slip.
Figure 8:
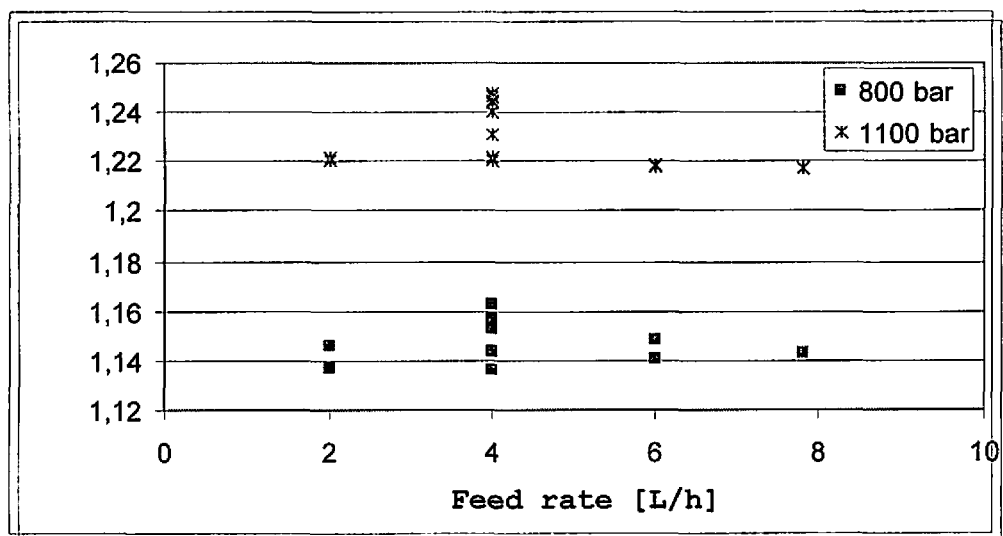
FIG. 8 shows the density as a function of the feed rate in spray-drying for a given slip composition and evaporation performance.
Figure 9:
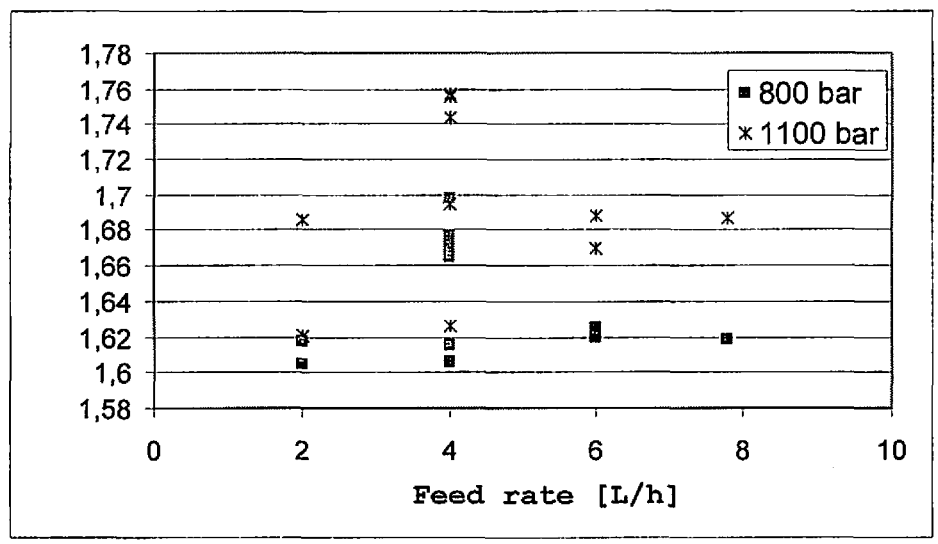
FIG. 9 shows the density of a compact fired at a temperature of up to 1100° C. as a function of the feed rate in spray-drying.

The investigations, the results of which are presented in FIGS. 4 and 5, show that the densities of the compacts decrease with increasing solids content or increasing feed rate through the spray tower.

As well as the processability in presses, where a high bulk density is required, it is also necessary to optimise the properties of the components, therefore it may be advantageous to set the solids content at not above 58 wt. % and not below 56 wt. %, in each case relative to the mass of the slip.

Example 5

Density of the Compact

In the further processing of the powder (spray granules) in presses, the powder is pressed into compacts and then fired. Decisive features for pressed or fired articles are the densities attained after pressing or firing and the bending strength after firing. Therefore the densities of the compressed or fired compacts were determined in relation to the solids content and the feed rate. The results are shown graphically in FIGS. 6, 7, 8 and 9.

The bending strengths were determined on the basis of DIN 51902. After compacting the test specimens with a pressing pressure of 1100 bar, they were max. 200 MPa. Without spray granulation, only bending strengths of 180 MPa are obtained.

A review of the measured values obtained is presented in Table 3.

Example 6

Comparison Between Continuous Dispersion and Batch Dispersion

The advantage of the combined method with continuous dispersion in a bead mill with <1 min residence time and subsequent spray-drying versus two-hour batch dispersion in a drum mill, also with subsequent spray granulation, is the even better material values of the products obtained. Higher bulk and tamped densities have the effect that further processing of the granules is improved, because they give better die filling than powder with low bulk density. This can be seen from the bending strengths of the compacts after carbonisation, which are also increased. The measured results are shown in the following Table 4. Furthermore, continuous operation is more economic owing to the higher space/time yield. Moreover, continuous operation can be automated more easily.

TABLE 1

| Dispersion | | continuous | batch |
|---|---|---|---|
| Bulk density | [g/cm³] | 0.532 | 0.520 |
| Tamped density | [g/cm³] | 0.593 | 0.576 |
| Compacted density, 800 bar | [g/cm³] | 1.137 | 1.188 |
| Density, fired 1100° C. | [g/cm³] | 1.617 | 1.636 |
| Bending strength | [MPa] | 159 | 124 |

Example 7

Comparison of the Liquefiers Used

The effects of the liquefiers NSF and lignin sulphonate on the product properties were investigated. By using NSF as liquefier, the values of the properties obtained for spray granules and compacts produced from them can be further improved, relative to the use of lignin sulphonate. The results are shown in Table 2.

TABLE 2

| Liquefier | | Lignin sulphonate | NSF |
|---|---|---|---|
| Bulk density | [g/cm³] | 0.527 | 0.528 |
| Tamped density | [g/cm³] | 0.599 | 0.595 |
| Density, compacted 800 bar | [g/cm³] | 1.136 | 1.157 |
| Density, fired 1100° C. | [g/cm³] | 1.615 | 1.698 |
| Bending strength | [MPa] | 158 | 169 |

Example 8

Binder

The influence of the binder on the products obtained according to the invention was investigated. By spray granulation without addition of binder, comparable material values of the products can be achieved as with addition of binder. The results are shown in the following Table 3.

TABLE 3

Influence of the binder on the material properties

| Compaction pressure | | | with binder | without binder | Null sample without granulation |
|---|---|---|---|---|---|
| 800 bar | $\rho_{pressed}$ | [g/cm³] | 1.161 | 1.162 | 1.178 |
| | $\rho_{fired\ 1100°\ C.}$ | [g/cm³] | 1.693 | 1.697 | 1.629 |
| | Bending strength | [MPa] | 158 | 186 | 162 |
| | Resistivity | [μΩ/m] | 39.11 | 37.35 | 44.23 |
| 900 bar | $\rho_{pressed}$ | [g/cm³] | 1.197 | 1.194 | 1.210 |
| | $\rho_{fired\ 1100°\ C.}$ | [g/cm³] | 1.716 | 1.715 | 1.667 |
| | Bending strength | [MPa] | 166 | 160 | 173 |
| | Resistivity | [μΩ/m] | 36.98 | 36.94 | 40.73 |
| | Bulk density | [g/cm³] | 0.531 | 0.498 | 0.400 |
| | Tamped density | [g/cm³] | 0.592 | 0.563 | 0.565 |

Example 9

Angle of Repose

The angle of repose was determined on the basis of DIN 53468. For determination, 60 g of sample material was poured from a funnel $d_{top}$=140 mm and $d_{bottom}$=10 mm, height=140 mm and the cone that formed was measured, with D standing for diameter.

An angle of repose of 18.9 to 22.1° is found for the spray-granulated material and of about 41° for the CARBOSINT® starting material.

Example 10

Grain Size Distribution

The grain sizes were measured by means of laser diffraction spectrometry and the $d_{50}$ value of the grain size distribution was determined. The results are shown below.

CARBOSINT® starting material: $d_{50}$=7-8 μm
CARBOSINT® granules: $d_{50}$=60-100 μm

We claim:

1. A continuous method for production of a semicoke powder with high bulk density and flowability, comprising the steps of dispersing a sinterable semicoke powder in water with addition of at least one binder and at least one liquefier, wherein the proportion of carbon in the dispersion is adjusted to at least 50 wt. %, relative to the mass of the dispersion, and the zeta potential of the dispersion is adjusted to less than −50 mV, the dispersion is submitted to homogenisation and stabilisation by continuous wet grinding with a residence time in the mill of less than 3 minutes, and the homogeneous dispersion is spray-dried.

2. The method according to claim 1, characterized in that a polymer of naphthalene sulphonic acid produced with formaldehyde is used as liquefier and polyethylene glycol with a molecular weight of 2,000 to 12,000 is used as binder.

3. The method according to claim 1, wherein wet grinding is carried out continuously in a ball mill.

4. The method according to claim 1, wherein the pH of the dispersion is adjusted to at least 7.

* * * * *

UNITED STATES PATENT AND TRADEMARK OFFICE
CERTIFICATE OF CORRECTION

PATENT NO. : 8,613,801 B2
APPLICATION NO. : 13/131651
DATED : December 24, 2013
INVENTOR(S) : Rainer Gadow et al.

It is certified that error appears in the above-identified patent and that said Letters Patent is hereby corrected as shown below:

(1) On the title page in the list of Assignee (73) of US 8,613,801 B2, please delete "Rheinkalk GmbH"

and insert -- Rütgers Germany GmbH, Castrop-Rauxel, Germany --.

Signed and Sealed this
Eighth Day of March, 2016

Michelle K. Lee
*Director of the United States Patent and Trademark Office*